United State
Takahashi et al.

[11] 3,841,736
[45] Oct. 15, 1974

[54] WIDE ANGLE OBJECTIVE LENS SYSTEM WITH LARGE BACK FOCUS

[75] Inventors: Yasuo Takahashi, Tokyo; Sadao Okudaira, Ranzan-machi, both of Japan

[73] Assignee: Asahi Kogaku Kogyo Kabushiki Kaisha, Tokyo-to, Japan

[22] Filed: May 2, 1973

[21] Appl. No.: 356,687

[30] Foreign Application Priority Data
May 11, 1972  Japan.................. 47-46604

[52] U.S. Cl. ............................................... 350/214
[51] Int. Cl. ............................................... G02b 9/00
[58] Field of Search ................................. 350/214

[56] References Cited
FOREIGN PATENTS OR APPLICATIONS
45-11790  12/1966  Japan.................. 350/214

*Primary Examiner*—Ronald L. Wibert
*Assistant Examiner*—Conrad Clark
*Attorney, Agent, or Firm*—Wolder & Gross

[57] ABSTRACT

A compact, wide angle lens system having a ratio of back focus to focal length exceeding 1.85:1 and excellent optical properties includes eleven lenses successively designated as the first to the eleventh lens in which the seventh and eighth lenses are a cemented doublet, and first, third, fourth, eighth and tenth lenses are negative and the remaining lenses are positive, the lens system satisfying the following conditions:

$$F/2.3 < |F_{1.2.3.4}| < F/1.4, F_{1.2.3.4} < 0 \quad (1)$$

$$F/1.2 < F_{1.2.3.4.5.6} < F/0.6 \quad (2)$$

$$0.5F < |r_{14}| < 0.8F, r_{14} < 0 \quad (3)$$

$$0.25 < n_8 - n_7 < 0.35 \quad (4)$$

$$0.9F < r_{19} < 1.5F \quad (5)$$

$$0.8F < F_7 < 1.2F \quad (6)$$

$$1.2 < |F_7|/|F_8| < 2.0, F_8 < 0$$

wherein F is the focal length of the entire lens system, $F_i$ is the focal length of the i-th lens, $F_{1.2...i}$ is the focal length of the lens sub-assembly including the first lens to the i-th lens, $N_i$ is the refractive index of the i-th lens at the d-line, $r_{14}$ is the radius of curvature of the mating rear and front faces of the seventh and eighth lenses respectively and $r_{19}$ is the radius of curvature of the rear face of the tenth lens.

2 Claims, 4 Drawing Figures

WIDE ANGLE OBJECTIVE LENS SYSTEM WITH LARGE BACK FOCUS

BACKGROUND OF THE INVENTION

The present invention relates generally to improvements in optical lens systems and it relates particularly to an improved wide angle objective lens system.

The wide angle lens systems, particularly those of very wide angle of field and large aperture, heretofore available, possess numerous drawbacks and disadvantages. Among these drawbacks and disadvantages are the relatively small back focus, large bulk, limited aperture ratio and poor optical properties and efficiencies.

SUMMARY OF THE INVENTION

It is a principal lens of the present invention to provide an improved optical ens system.

Another object of the present invention is to provide an improved wide angle objective lens.

Still another object of the present invention is to provide an improved extra wide angle, high aperture ratio objective lens system having a large rear focus to focal length ratio.

A further object of the present invention is to provide an improved lens system of the above nature characterized by its high efficiency and resolution, low distortion and aberration, a back focus to focal length exceeding 1.85:1 and a large aperture ratio, of the order of 3.5:1 and a field angle exceeding 100°.

In a sense, the present invention contemplates the provision of a wide angle lens system comprising eleven consecutively designated lenses in which the seventh and eighth lenses form a cemented doublet with their mating surfaces defining a single face, the lenses being dimensioned and related to satisfy the following conditions or requirements:

$$F/2.3 < |F_{1,2,3,4}| < F/1.4, \quad F_{1,2,3,4} < 0 \quad (1)$$

$$F/1.2 < F_{1,2,3,4,5,6} < F/0.6 \quad (2)$$

$$0.5F < |r_{14}| < 0.8F, \quad r_{14} < 0 \quad (3)$$

$$0.25 < n_8 - n_7 < 0.35 \quad (4)$$

$$0.9F < r_{19} < 1.5F \quad (5)$$

$$0.8F < F_7 < 1.2F \quad (6)$$

$$1.2 < |F_7|/|F_8| < 2.0, \quad F_8 < 0$$

wherein F is the focal length of the entire lens system, $F_i$ is the focal length of the i-th lens, $F_{1,2\ldots i}$ is the focal length of the sub-system including the first to the i-th lens, $N_i$ is the d-line refractive index of the i-th lens and $r_j$ is the radius of curvature of the j-th lens face.

The first lens is a negative meniscus lens, the second lens is a positive lens, the third and fourth lenses are negative meniscus lenses, the fifth and sixth lenses are biconvex lenses, the seventh lens is positive and separated from the preceding lenses by a diaphragm, the eighth lens is negative, the ninth lens is positive, the tenth lens is negative and the eleventh lens is positive, the rear faces of the ninth, tenth and eleventh lenses being of greater curvature than the front faces thereof.

Considering the requirements as above enumerated, the requirement (1) functions to establish the powers of the negative lenses included in the front or object side lens group so that a back focus substantially twice the focal length of the lens system may be obtained. It is obvious that requirement (1) is also useful in reducing the incident angle, which is extremely wide with respect to the object side lens group, with respect to the fifth lens and the following lenses. When $F_{1,2,3,4}$ is negative and shorter than F/2.3, however, this requirement would be met but this requirement would be disadvantageous for the image side or rear lens group. The fact that a wide angle lens assembly requires an increased light quantity conflicts with the effective correction of aberration, particularly, of coma aberration while reduction of the Petzval's sum interferes with the achievement of a sufficiently wide incident angle. Furthermore, it will be difficult to accomplish the object of the second lens such that the chromatic aberration and the distortion are effectively prevented by the second lens from increasing in negative direction. When $F_{1,2,3,4}$ is longer than F/1.4, on the other hand, apart from a problem arising in the reverse direction, it would be difficult to achieve the present object unless a suitable counterplan is considered on the image side group.

The requirement (2) principally relates, in association with the previous requirement (1), to the correction of the chromatic aberration providing influence on magnification, which is highly important in the wide angle lens. A considerable difference is seen between the two embodiments, as hereinafter described in detail, with respect to the arrangement of glass material of various types. Both these embodiments are, however, similar in that the chromatic aberration in the range from the first to the twelfth surface is insufficiently corrected substantially to an equal extent. In the first, there is found a residual of the chromatic aberration larger than that in the second embodiment due to the value of $\nu_1$, Abbe's number, selected at 40 while $\nu_2$ is selected at 48.9 so that the chromatic aberration is corrected somewhat in the direction of insufficiency. In the second embodiment, on the other hand, $\nu_1$ is selected approximately at 60 and $\nu_2$ approximately at 64. Both embodiments are attended with a residual of the chromatic aberration due to excessive correction. In view of the fact that the lens assembly of the present invention is adapted for a wide photographing angle, it will be reasonably expected from the fact as above mentioned in connection with the two embodiments that the chromatic aberration may be substantially corrected to a similar extent in the range ending at the twelfth surface. It is the object of the requirement (2) to achieve this. When $F_{1,2,3,4,5,6}$ is shorter than F/1.2, the object might be achieved by various combinations of the correction of the chromatic aberration, but this would result in reduced Petzval's sum, reduced efficiency of the object side group and, possibly, insufficiently corrected spherical aberration, so that the correction in the seventh lens and the following lenses would be difficult. When $F_{1.2.3.4.5.6}$ is longer than F/0.6, there would arise a problem also in the arrangement of glass materials of various types for the correction of the chromatic aberration. Correction of the astigmatic aberration would often be difficult, since the Petzval's sum would increase.

The requirement (3) functions in association with the requirement (4) to correct the spherical aberration still insufficiently corrected in the direction of excessive correction. Insufficiency of correction of the spherical aberration necessarily occurs in the image side group when a back focus longer than a certain length is required to satisfy the demand of the lens assembly according to the present invention. This is marked especially at the seventeenth and twenty-first surfaces. However, it is undesirable to face a convex surface of short curvature radius to the object side in order that no coma aberration occurs on the sixteenth surface, the twentieth surface and so on caused by light rays of relatively low incident heights. Thus, it is unavoidable that the seventeenth and twenty-first surfaces should bear burdens and this is true also from the view-point of distortion. This is the reason why the spherical aberration is corrected by making use of the refractive index at the fourteenth surface. When $r_{14}$ assumes a negative value larger than 0.5F and $n_8 - n_7$ is larger than 0.35, insufficiency in correction of the spherical aberration occurring in the image side group would be possibly corrected in the direction of excessive correction. When $r_{14}$ is larger than 0.8F and $n_8 - n_7$ is smaller than 0.25, on the other hand, the desired aberration balance could not be easily obtained unless the rest of the assembly is modified and some suitable countermeasures are employed.

The requirement (5) is to define the proper range within which the coma aberration principally with respect to the light rays of relatively low incident heights is effectively corrected. When $r_{19}$ is smaller than 0.9F, the light rays vary in the direction along which the image height increases and possibly form a flare. When $r_{19}$ is larger than 1.5F, the intention on which introduction of this negative lens is based would become less meaningful especially for the light rays of wide incident angles.

The requirement (6) is to give, also in association with the requirements (3) and (4), proper allotments of correction of chromatic, coma, spherical and the other aberrations depending upon the particular ratios $F_7 : F_8$ of the seventh and eighth lenses which are cemented together, forming a negative lens as a whole. When $F_7/F_8$ is smaller than 1.2, correction of the coma aberration would be difficult in the direction along which the image height increases with respect to the light rays of relatively low incident heights so far as an emphasis is put on an excessive correction of the spherical aberration, since $F_8$ would be too long compared to $F_7$. It is believed in this case that the correction of spherical aberration would be advantageously allotted to these cemented lenses since it would possibly be difficult to allot the correction of spherical aberration to any other lenses from the viewpoint of the manner in which the lens assembly according to the present invention is composed. When $F_7/F_8$ is larger than 2, it would be preferred to select $n_8$ of a higher value since the correction of coma aberration would be excessive in contrast to the previous case so far as correction of spherical aberration is sufficiently accomplished. Furthermore, in this case, the overall aberration balance would be lost as the requirement (4) is departed from since the influence upon the other kinds of aberration would vary.

Lens systems constructed in accordance with the present invention with an aperture ratio of 3.5:1 and an angle of field exceeding 100° are compact, possess back focus to focal length ratios exceeding 1.85:1 and have excellent optical properties and efficiencies.

DESCRIPTION OF THE PREFERRED EMBODIMENTS

Figure 1:
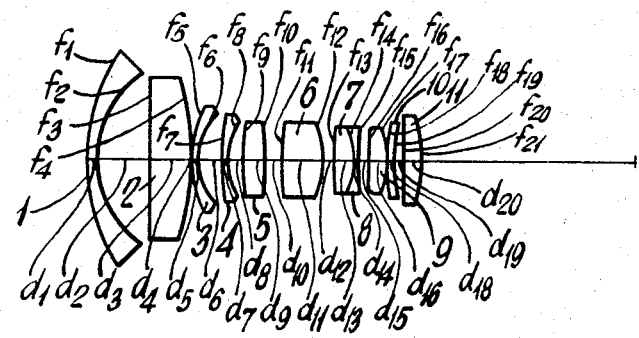
FIG. 1 is a longitudinal view of a preferred embodiment of the present invention.
Figure 2:
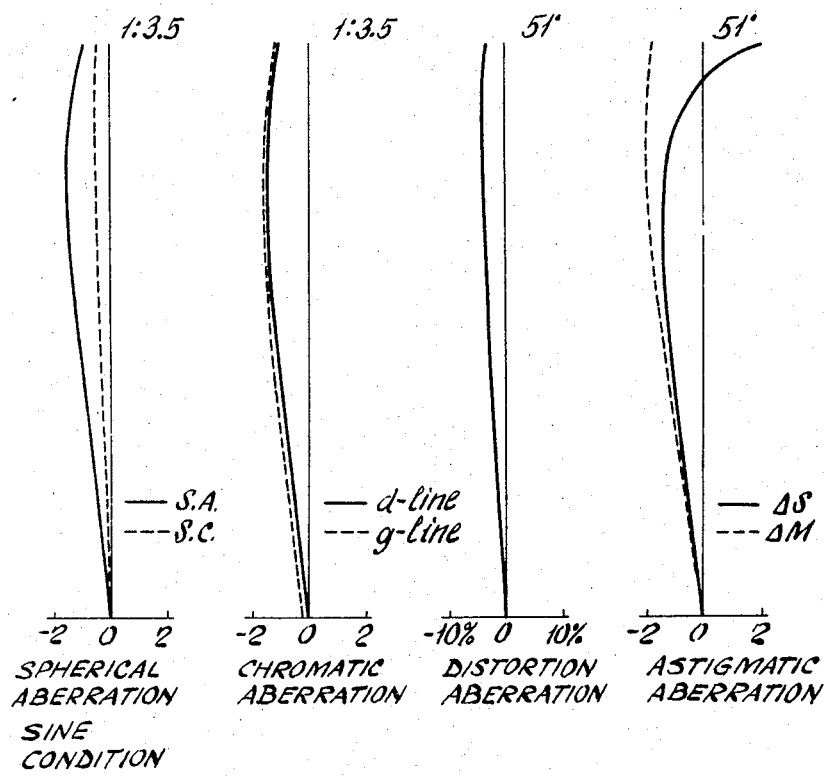
FIG. 2 is a set of aberration curves of an example of the lens system of FIG. 1.

Referring now to the drawings and particularly FIGS. 1 and 2 thereof which represent a preferred embodiment of the present invention, the reference numerals 1 to 11 generally consecutively designate the lenses forming the improved wide angle lens system, the first or front lens 1 being toward the object side and the eleventh or rear lens being toward the image side. The seventh and eighth lenses 7 and 8 are cemented at their mating confronting faces to form a doublet with the cemented surfaces defining a single face.

The first lens 1 is a negative meniscus lens of thickness $d_1$, refractive index $N_1$ and Abbe's number $\nu_1$ and has a convex front face $f_1$ of radius of curvature $r_1$ and a concave rear face $f_2$ of radius of curvature $r_2$. The second lens is a positive lens of thickness $d_3$, refractive index $N_2$ and Abbe's number $\nu_2$ and has a front face $f_3$ spaced a distance $d_2$ from face $f_2$ and of a radius of curvature $r_3$ and a rear face $f_4$ of radius of curvature $r_4$. The third lens 3 is a negative meniscus lens of thickness $d_5$, refractive index $N_3$ and Abbe's number $\nu_3$ and has a front face $f_5$ of radius of curvature $r_5$ spaced from face $f_4$ a distance $d_4$ and a rear face $f_6$ of radius of curvature $r_6$. The fourth lens 4 is a negative meniscus lens of thickness $d_7$ refractive index $N_4$ and Abbe's number $\nu_4$ and has a front face $f_7$ spaced a distance $d_6$ from face $f_6$ and a rear face $f_8$. The fifth lens is biconvex and of a thickness $d_9$, a refractive index $N_5$ and an Abbe's number $\nu_5$ and has a front face $f_9$ of radius of curvature $r_9$ spaced a distance $d_8$ from face $f_8$ and a rear face $f_{10}$. The sixth lens 6 is biconvex and of a thickness $d_{11}$, refractive index $N_6$ and Abbe's number $\nu_6$ and has a front face $f_{11}$ spaced from face $f_{10}$ a distance $d_{10}$ and a rear face $f_{12}$ of radius of curvature $r_{12}$.

The seventh lens 7 is positive with a thickness $d_{13}$, a refractive index $N_7$ and an Abbe's number $\nu_7$ and has a front face $f_{13}$ of radius of curvature $r_{13}$ and spaced from face $f_{12}$ a distance $d_{12}$ and a rear face $f_{14}$ of radius of curvature $r_{14}$. The eighth lens 8 is negative and cemented to seventh lens 7 and is of thickness $d_{14}$, refractive index $N_8$ and Abbe's number $\nu_8$ and has its front face common with face $f_{14}$ and a rear face $f_{15}$. The ninth lens 9 is positive, of thickness $d_{16}$, refractive index $N_9$ and Abbe's number $\nu_9$ and has a front $f_{16}$ of radius of curvature $r_{16}$ spaced a distance $d_{15}$ and a rear face $f_{17}$ of radius of curvature $r_{17}$. The tenth lens 10 is negative and of thickness $d_{18}$, refractive index $N_{10}$ and Abbe's number $\nu_{10}$ and has a front face $f_{18}$ of radius of curvature $r_{18}$ spaced from face $f_{17}$ a distance $d_{17}$ and a rear face $f_{19}$ of radius of curvature $r_{19}$, and the eleventh lens 11 is positive with a thickness $d_{20}$, a refractive index $N_{11}$ and an Abbe's number $\nu_{11}$ and has a front face $f_{20}$ with a radius of curvature $r_{20}$ spaced a distance $d_{19}$ from face $f_{19}$ and a rear face $f_{21}$ of radius of curvature $r_{21}$.

The following Table I sets forth the numerical values of $r_j$, $d_j$, $n_i$ and $\nu_i$ of a specific example of the lens system of FIG. 1 as well as other parameters, based on a focal length of the lens system F 100, the refractive indices being in the d-line:

Table I

| | | | | | |
|---|---|---|---|---|---|
| $r_1$ | 196.25 | $d_1$ | 9.57 | $n_1/\nu_1$ | 1.80610/40.8 |
| $r_2$ | 95.73 | $d_2$ | 47.09 | | |
| $r_3$ | 3033.14 | $d_3$ | 43.17 | $n_2/\nu_2$ | 1.53172/48.9 |
| $r_4$ | −342.39 | $d_4$ | 0.65 | | |
| $r_5$ | 130.31 | $d_5$ | 7.23 | $n_3/\nu_3$ | 1.69350/53.3 |
| $r_6$ | 57.80 | $d_6$ | 18.81 | | |
| $r_7$ | 246.94 | $d_7$ | 7.45 | $n_4/\nu_4$ | 1.71300/54.0 |
| $r_8$ | 72.22 | $d_8$ | 14.74 | | |
| $r_9$ | 235.07 | $d_9$ | 18.11 | $n_5/\nu_5$ | 1.74077/27.8 |
| $r_{10}$ | −357.57 | $d_{10}$ | 18.97 | | |
| $r_{11}$ | 272.12 | $d_{11}$ | 36.59 | $n_6/\nu_6$ | 1.60562/43.7 |
| $r_{12}$ | −86.37 | $d_{12}$ | 13.70 | | |
| $r_{13}$ | 312.47 | $d_{13}$ | 18.11 | $n_7/\nu_7$ | 1.51823/59.0 |
| $r_{14}$ | −52.41 | $d_{14}$ | 5.76 | $n_8/\nu_8$ | 1.83400/37.2 |
| $r_{15}$ | 894.12 | $d_{15}$ | 8.43 | | |
| $r_{16}$ | −1416.27 | $d_{16}$ | 16.64 | $n_9/\nu_9$ | 1.69350/53.3 |
| $r_{17}$ | −110.97 | $d_{17}$ | 0.49 | | |
| $r_{18}$ | −887.30 | $d_{18}$ | 5.27 | $n_{10}/\nu_{10}$ | 1.80518/25.4 |
| $r_{19}$ | 118.00 | $d_{19}$ | 10.71 | | |
| $r_{20}$ | −1386.54 | $d_{20}$ | 16.31 | $n_{11}/\nu_{11}$ | 1.64850/53.0 |
| $r_{21}$ | −98.62 | | | | |

$F_7 = 102.06$  $|F_{1.2.3.4}| = F/2.081 = 48.05$
$F_8 = -69.76$  $F_{1.2.3.4.5.6} = F/0.992 = 100.8$
$F_7/|F_8| = 1.463$  $F_B = 1.987F = 198.7$

In Table I, $F_i$ is the focal length of the i-th lens, $F_{1.2...i}$ is the focal length of the sub-system including the first to the i-th lens and $F_B$ is the back focus.

The following Table II lists the Seidel's coefficients of the example of Table I.

TABLE II

| | $S_1$ | $S_2$ | $S_3$ | P | $S_5$ |
|---|---|---|---|---|---|
| 1 | 0.03 | 0.03 | 0.03 | 0.23 | 0.25 |
| 2 | −1.09 | 0.24 | −0.05 | −0.47 | 0.11 |
| 3 | 0.06 | 0.08 | 0.11 | 0.01 | 0.17 |
| 4 | −0.00 | 0.01 | −0.02 | 0.10 | −0.36 |
| 5 | 0.65 | 0.21 | 0.07 | 0.31 | 0.13 |
| 6 | −15.60 | 0.91 | −0.05 | −0.71 | 0.04 |
| 7 | 3.12 | 0.69 | 0.15 | 0.17 | 0.07 |
| 8 | −46.94 | 0.87 | −0.02 | −0.58 | 0.01 |
| 9 | 22.50 | 1.60 | 0.11 | 0.18 | 0.02 |
| 10 | −0.37 | −0.30 | −0.25 | 0.12 | −0.11 |
| 11 | 6.65 | 1.29 | 0.25 | 0.14 | 0.08 |
| 12 | 37.45 | −4.67 | 0.58 | 0.44 | −0.13 |
| 13 | −0.08 | 0.12 | −0.18 | 0.11 | 0.11 |
| 14 | −37.38 | 1.14 | −0.04 | −0.18 | 0.01 |
| 15 | 0.00 | 0.00 | 0.03 | 0.05 | −0.18 |
| 16 | −0.02 | 0.04 | −0.06 | −0.03 | 0.15 |
| 17 | 23.38 | −1.43 | 0.09 | 0.37 | −0.03 |
| 18 | −4.20 | 0.98 | −0.23 | −0.05 | 0.06 |
| 19 | −3.69 | −1.45 | −0.57 | −0.38 | −0.04 |
| 20 | 0.00 | 0.01 | 0.05 | −0.03 | 0.18 |
| 21 | 20.11 | 0.01 | 0.00 | 0.40 | 0.00 |
| SUM | 4.59 | 0.37 | 0.02 | 0.11 | 0.23 |

The ratio of the back focus $F_B$ to the lens system focal length F in the above example is 1.987:1 and the various aberration characteristics of the lens system are excellent as illustrated by the graphs of FIG. 2 to an aperture ratio of 1.3:5 and a field exceeding 100°.

Figure 3:
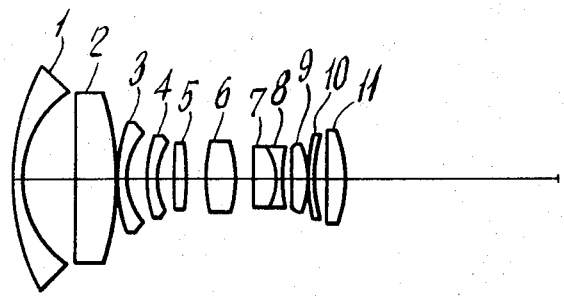
FIG. 3 is a longitudinal view of another embodiment of the present invention.

In FIG. 3 there is illustrated another embodiment of the present invention which is similar to that first described primarily in the specific dimensions and spatial relationships of the lenses and the two embodiments are otherwise alike, and similar designations are employed to identify the corresponding lenses, their thicknesses and spacings and their refractive indices and Abbe's numbers in the specific example thereof set forth in the following Table III which is likewise based on a lens system of focal length F = 100.

TABLE III

| | | | | | |
|---|---|---|---|---|---|
| $r_1$ | 229.52 | $d_1$ | 8.64 | $n_1/\nu_1$ | 1.64000/60.2 |
| $r_2$ | 94.56 | $d_2$ | 47.57 | | |
| $r_3$ | ∞ | $d_3$ | 39.89 | $n_2/\nu_2$ | 1.51633/64.1 |
| $r_4$ | −312.73 | $d_4$ | 1.62 | | |
| $r_5$ | 150.12 | $d_5$ | 9.62 | $n_3/\nu_3$ | 1.64000/60.2 |
| $r_6$ | 56.47 | $d_6$ | 18.91 | | |
| $r_7$ | 167.82 | $d_7$ | 9.62 | $n_4/\nu_4$ | 1.51633/64.1 |
| $r_8$ | 65.37 | $d_8$ | 16.22 | | |
| $r_9$ | 333.50 | $d_9$ | 9.62 | $n_5/\nu_5$ | 1.64000/60.2 |
| $r_{10}$ | −1093.72 | $d_{10}$ | 21.62 | | |
| $r_{11}$ | 181.10 | $d_{11}$ | 25.40 | $n_6/\nu_6$ | 1.62588/35.7 |
| $r_{12}$ | −95.77 | $d_{12}$ | 15.68 | | |
| $r_{13}$ | 424.27 | $d_{13}$ | 23.24 | $n_7/\nu_7$ | 1.51633/64.1 |
| $r_{14}$ | −58.17 | $d_{14}$ | 6.40 | $n_8/\nu_8$ | 1.83400/37.2 |
| $r_{15}$ | 253.87 | $d_{15}$ | 8.11 | | |
| $r_{16}$ | −1502.70 | $d_{16}$ | 14.59 | $n_9/\nu_9$ | 1.48749/70.1 |
| $r_{17}$ | −72.53 | $d_{17}$ | 0.54 | | |
| $r_{18}$ | 324.32 | $d_{18}$ | 5.78 | $n_{10}/\nu_{10}$ | 1.80518/25.4 |
| $r_{19}$ | 121.74 | $d_{19}$ | 10.81 | | |
| $r_{20}$ | 1043.14 | $d_{20}$ | 18.92 | $n_{11}/\nu_{11}$ | 1.51633/64.1 |
| $r_{21}$ | −106.74 | | | | |

$F_7 = 100.70$  $|F_{1.2.3.4}| = F/1.786 = 55.99$
$F_8 = -56.22$  $F_{1.2.3.4.5.6} = F/0.878 = 113.90$
$F_7/|F_8| = 1.791$  $F_B = 1.997F = 199.7$

The following Table IV lists Seidel's coefficients for the lens system of Table I:

Table IV

| | $S_1$ | $S_2$ | $S_3$ | P | $S_5$ |
|---|---|---|---|---|---|
| 1 | 0.20 | 0.03 | 0.03 | 0.17 | 0.26 |
| 2 | −0.99 | 0.23 | −0.06 | −0.41 | 0.11 |
| 3 | 0.04 | 0.07 | 0.11 | 0.00 | 0.18 |
| 4 | 0.00 | 0.00 | −0.01 | 0.11 | −0.38 |
| 5 | 0.42 | 0.18 | 0.07 | 0.26 | 0.14 |
| 6 | −16.00 | 1.04 | −0.07 | −0.69 | 0.05 |
| 7 | 4.24 | 0.65 | 0.10 | 0.20 | 0.05 |
| 8 | −37.55 | 0.41 | −0.00 | −0.52 | 0.01 |
| 9 | 11.98 | 1.53 | 0.19 | 0.12 | 0.04 |
| 10 | −2.02 | −0.73 | −0.27 | 0.04 | −0.08 |
| 11 | 15.27 | 2.15 | 0.30 | 0.21 | 0.07 |
| 12 | 25.72 | −3.83 | 0.57 | 0.40 | −0.15 |
| 13 | −0.12 | 0.14 | −0.18 | 0.08 | 0.12 |
| 14 | −34.75 | 0.83 | −0.02 | −0.20 | 0.01 |
| 15 | −1.95 | −0.90 | −0.42 | −0.18 | −0.27 |
| 16 | 0.10 | 0.13 | 0.16 | −0.02 | 0.18 |
| 17 | 26.60 | −0.61 | 0.01 | 0.45 | −0.01 |
| 18 | −0.01 | 0.04 | −0.17 | 0.14 | 0.12 |
| 19 | −2.60 | −1.09 | −0.46 | −0.37 | −0.34 |
| 20 | 0.01 | 0.02 | 0.05 | 0.03 | 0.17 |
| 21 | 16.22 | 0.13 | 0.00 | 0.32 | 0.00 |
| Sum | 4.61 | 0.40 | −0.03 | 0.14 | 0.26 |

Figure 4:
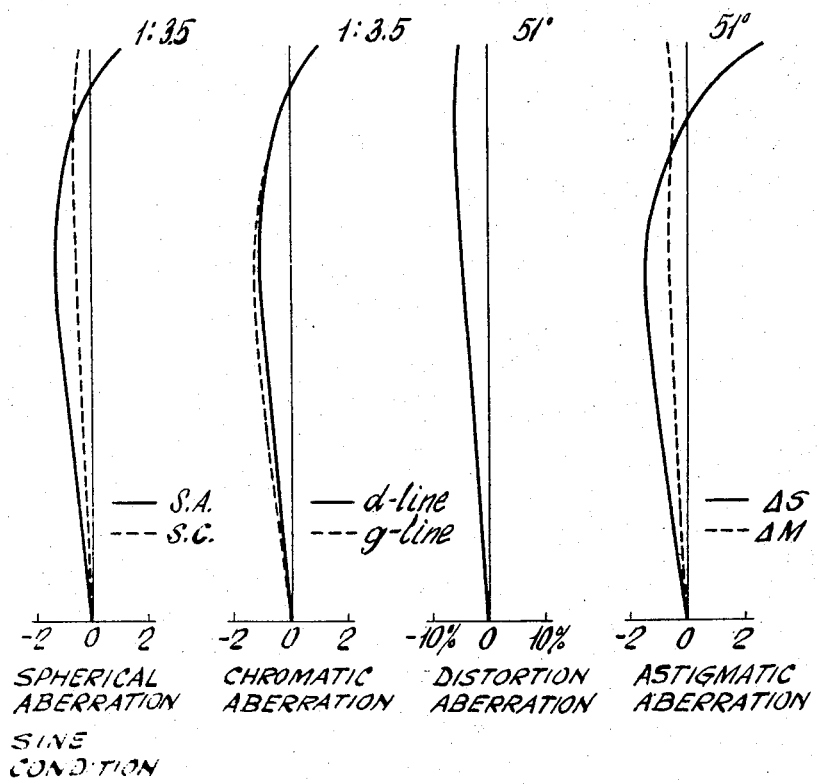
FIG. 4 is a view similar to FIG. 2 as related to FIG. 3.

The ratio of the back focus $F_B$ to the lens system focal length F is 199.7:1 and the optical characteristics of the lens system are excellent demonstrated by the set of graphs in FIG. 4.

While there have been described and illustrated preferred embodiments of the present invention, it is apparent that numerous alterations, omissions and additions may be made without departure from the spirit thereof. It should be noted that the radii of curvatures $r_i$ and the interface distances $d_i$ are not based on any particular system of linear dimensions so that they represent relative values among themselves, bearing relationships corresponding to the values given in the specific examples.

The ratio of the back focus $F_B$ to the lens system focal length F is 199.7:1 and the optical characteristics of the lens system are excellent demonstrated by the set of graphs in FIG. 4.

While there have been described and illustrated preferred embodiments of the present invention it is apparent that numerous alterations, omissions and additions may be made without departing from the spirit thereof. It should be noted that the radii of curvatures $r_j$ and the interface distances $d_i$ are not based on any particular system of linear dimensions so that they represent relative values among themselves, bearing relationships corresponding to the values given in the specific examples.

We claim:

1. A wide angle lens system comprising eleven lenses consecutively designated from the front lens on the object side to the rear lens on the image side as the first to the eleventh lens, the seventh and eighth lenses being joined at their confronting mating faces to define a singly designated face and form a doublet, said lenses having the following dimensions and relationships:

| | | | | | |
|---|---|---|---|---|---|
| $r_1$ | 196.25 | $d_1$ | 9.57 | $n_1/\nu_1$ | 1.80610/40.8 |
| $r_2$ | 95.73 | $d_2$ | 47.09 | | |
| $r_3$ | 3033.14 | $d_3$ | 43.17 | $n_2/\nu_2$ | 1.53172/48.9 |
| $r_4$ | −342.39 | $d_4$ | 0.65 | | |
| $r_5$ | 130.31 | $d_5$ | 7.23 | $n_3/\nu_3$ | 1.69350/53.3 |
| $r_6$ | 57.80 | $d_6$ | 18.81 | | |
| $r_7$ | 246.94 | $d_7$ | 7.45 | $n_4/\nu_4$ | 1.71300/54.0 |
| $r_8$ | 72.22 | $d_8$ | 14.74 | | |
| $r_9$ | 235.07 | $d_9$ | 18.11 | $n_5/\nu_5$ | 1.74077/27.8 |
| $r_{10}$ | −357.57 | $d_{10}$ | 18.97 | | |
| $r_{11}$ | 272.12 | $d_{11}$ | 36.59 | $n_6/\nu_6$ | 1.60562/43.7 |
| $r_{12}$ | −86.37 | $d_{12}$ | 13.70 | | |
| $r_{13}$ | 312.47 | $d_{13}$ | 18.11 | $n_7/\nu_7$ | 1.51823/59.0 |
| $r_{14}$ | −52.41 | $d_{14}$ | 5.76 | $n_8/\nu_8$ | 1.83400/37.2 |
| $r_{15}$ | 894.12 | $d_{15}$ | 8.43 | | |
| $r_{16}$ | −1416.27 | $d_{16}$ | 16.64 | $m_9/\nu_9$ | 1.69350/53.3 |
| $r_{17}$ | −110.97 | $d_{17}$ | 0.49 | | |
| $r_{18}$ | −887.30 | $d_{18}$ | 5.27 | $n_{10}/\nu_{10}$ | 1.80518/25.4 |
| $r_{19}$ | 118.00 | $d_{19}$ | 10.71 | | |
| $r_{20}$ | −1386.54 | $d_{20}$ | 16.31 | $n_{11}/\nu_{11}$ | 1.64850/53.0 |
| $r_{21}$ | −98.62 | | | | | wherein $r_j$ is the radius of curvature of the j-th lens face, $d_j$ is the axial distance between the j-th face and the next rearwardly succeeding face, $N_i$ is the d-line refractive index of the i-th lens and $\nu_i$ is the Abbe's number of the i-th lens.

2. A wide angle lens system comprising eleven lenses consecutively designated from the front lens on the object side to the rear lens on the image side as the first to the eleventh lens, the seventh and eighth lenses being joined at their confronting mating faces to define a singly designated face and form a doublet, said lenses having the following dimensions and relationships:

| | | | | | |
|---|---|---|---|---|---|
| $r_1$ | 229.52 | $d_1$ | 8.64 | $n_1/\nu_1$ | 1.64000/60.2 |
| $r_2$ | 94.56 | $d_2$ | 47.57 | | |
| $r_3$ | ∞ | $d_3$ | 39.89 | $n_2/\nu_2$ | 1.51633/64.1 |
| $r_4$ | −312.73 | $d_4$ | 1.62 | | |
| $r_5$ | 150.12 | $d_5$ | 9.62 | $n_3/\nu_3$ | 1.64000/60.2 |
| $r_6$ | 56.47 | $d_6$ | 18.91 | | |
| $r_7$ | 167.82 | $d_7$ | 9.62 | $n_4/\nu_4$ | 1.51633/64.1 |
| $r_8$ | 65.37 | $d_8$ | 16.22 | | |
| $r_9$ | 333.50 | $d_9$ | 9.62 | $n_5/\nu_5$ | 1.64000/60.2 |
| $r_{10}$ | −1093.72 | $d_{10}$ | 21.62 | | |
| $r_{11}$ | 181.10 | $d_{11}$ | 25.40 | $n_6/\nu_6$ | 1.62588/35.7 |
| $r_{12}$ | −95.77 | $d_{12}$ | 15.68 | | |
| $r_{13}$ | 424.27 | $d_{13}$ | 23.24 | $n_7/\nu_7$ | 1.51633/64.1 |
| $r_{14}$ | −58.17 | $d_{14}$ | 6.40 | $n_8/\nu_8$ | 1.83400/37.2 |

-Continued

| | | | | | |
|---|---|---|---|---|---|
| $r_{15}$ | 253.87 | $d_{15}$ | 8.11 | | |
| $r_{16}$ | −1502.70 | $d_{16}$ | 14.59 | $n_9/\nu_9$ | 1.48749/70.1 |
| $r_{17}$ | −72.53 | $d_{17}$ | 0.54 | | |
| $r_{18}$ | 324.32 | $d_{18}$ | 5.78 | $n_{10}/\nu_{10}$ | 1.80518/25.4 |
| $r_{19}$ | 121.74 | $d_{19}$ | 10.81 | | |
| $r_{20}$ | 1043.14 | $d_{20}$ | 18.92 | $n_{11}/\nu_{11}$ | 1.51633/64.1 |
| $r_{21}$ | −106.74 | | | | | wherein $r_j$ is the radius of curvature of the j-th lens face, $d_j$ is the axial distance between the j-th lens face and the next rearwardly succeeding lens face $N_i$ is the d-line refractive index of the i-th lens and $\nu_i$ is the Abbe's number of the i-th lens.

\* \* \* \* \*